2,991,005
COMPRESSOR SCAVENGING SYSTEM
Russell S. Hall, Indianapolis, Ind., assignor to General Motors Corporation, Detroit, Mich., a corporation of Delaware
Filed Oct. 14, 1957, Ser. No. 690,063
11 Claims. (Cl. 230—207)

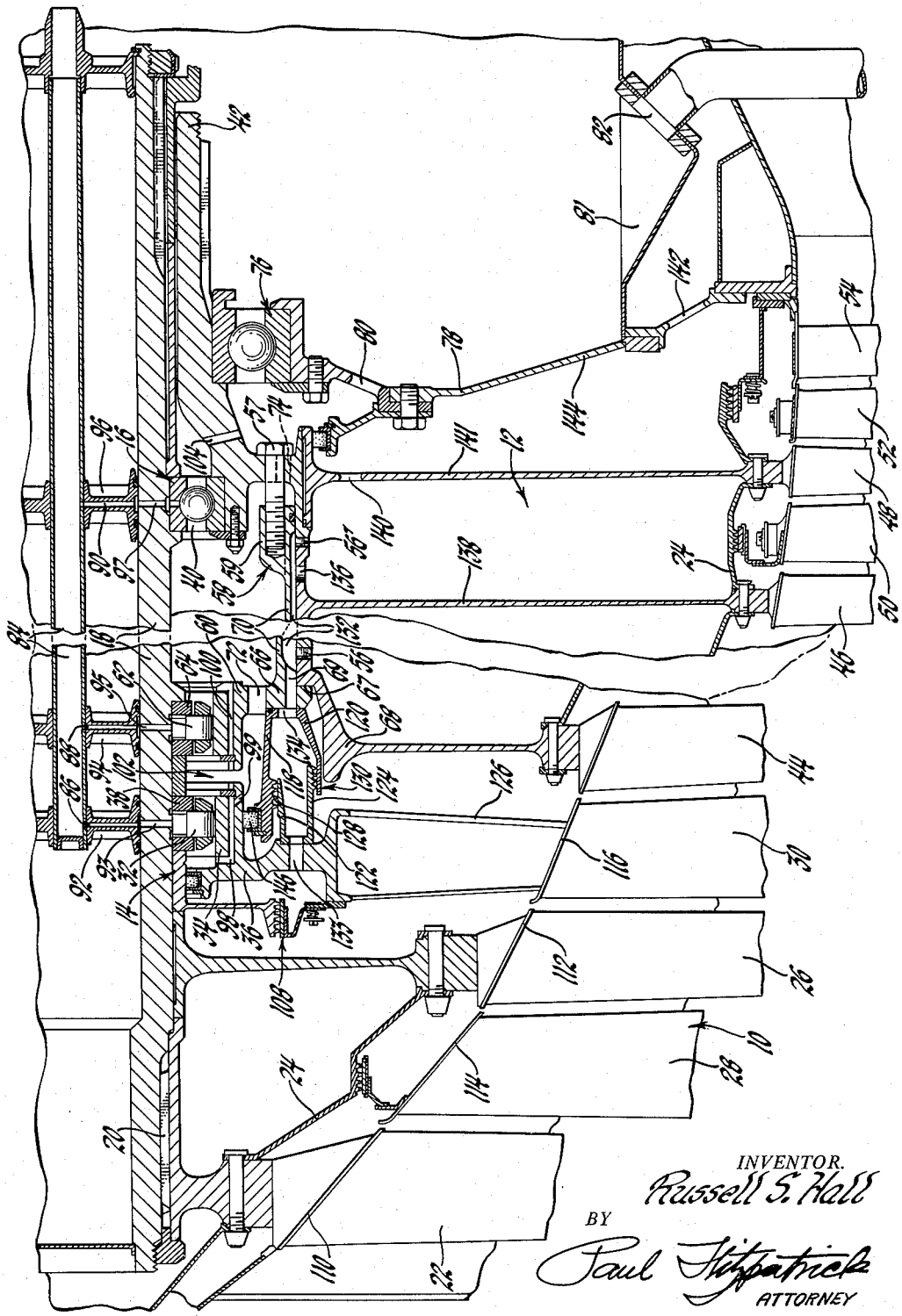

This invention relates to a bearing lubricating and air venting system for multi-spool engine compressors.

In multi-spool compressors such as those in gas turbines, means must be provided for carrying off the bearing lubricant so that a proper re-circulation of the lubricant can be obtained. Also, some means must be provided to carry away the hot gases leaking through the labyrinth seals usually provided between rotor and stator blades to prevent the hot gases from reaching the bearings, thereby causing possible failure, and to prevent undesirable axial forces on the rotors.

This invention accomplishes the above objects by providing an annular tapered tie-bolt connecting the stages of a high pressure compressor rotor, the tie-bolt acting as a pump and communicating with the bearings at one end and with a sump at the opposite end. With this invention, centrifugal force will force the used lubricating fluid from the bearing along the tapered tie-bolt to the sump. Furthermore, the connection of the tie-bolt to the rotors provides a space for the passage of air leaking through the labyrinth seals.

Other features and advantages will become apparent by reference to the detailed description of the preferred embodiment of the invention and to the drawing thereof wherein:

The figure shows a dual spool compressor section embodying this invention, the view being a partial one taken on a plane containing the axis of the compressors.

Referring now to the drawing, there is shown therein a first or low pressure compressor 10 cooperating with a second or high pressure compressor 12, both compressors being rotatable with respect to each other by means of a plurality of bearings 14 and 16.

Referring now more in detail to the figure, there is shown therein a low pressure compressor drive shaft 18 adapted to be driven by a suitable turbine (not shown). Splined at 20 to the drive shaft is a first stage rotor assembly 22 connected by a spacer 24 with a second stage rotor assembly 26 to form the low pressure compressor rotor. Cooperating with the first and second stage rotor assemblies are first and second stage stator assemblies 28 and 30 connected at their outer peripheries to the compressor casing by any suitable means (not shown). Suitably supporting the low pressure compressor rotor assemblies is a roller bearing means 32 having outer race 34 mounted in a support 36 connected to the second stage stator assembly 30 with the inner race 38 secured to the drive shaft 18.

Shaft 18 is rotatably supported by a ball bearing 40 mounted in the high pressure compressor drive shaft 42 adapted to be driven by a second suitable turbine (not shown). Drive shaft 42 is adapted to drive the rotor assemblies 44, 46 and 48 comprising stages of the high pressure compressor, said rotor assemblies cooperating with the several stator stage assemblies 50, 52 and 54 suitably interposed between said rotor assemblies and secured at their outer peripheries to the compressor casing (not shown). Rotor assemblies 44, 46 and 48 are bolted together at the rims through spacers 24.

As seen in the figure, only a portion of the stages of the high pressure compressor are shown, and it will be obvious that any number of stages could be used without departing from the scope of the invention.

In the figure, the disks of the rotor assemblies of the high pressure compressor 12 are connected to each other at their hubs by face splines 56 on each hub, and are connected torsionally to the drive shaft by face splines 56' on the hub of rotor assembly 46 and on shaft 42. The rotor stages are fixed to the drive shaft 42 by a ring of bolts 57 threaded into ribs 59 in one end of an elongated tie-bolt member 58 having on its other end a flange 60 secured to the outer race of a roller bearing means 62, the inner race 64 being secured to the drive shaft 18. Around the flange portion 60, the tie-bolt 58 is provided with a flange or head 66 having a shoulder 67 engaging the hub 68 of the first stage rotor of the compressor 12. Holes 69 in the head provide for air flow, as will be explained.

The tie-bolt 58 is a hollow annular axially or longitudinally tapered or frusto-conically shaped member having a tapered wall 70 cooperating with openings 72 provided in the flange 60 and openings 74 bored between the bolts 57 for draining the lubricant (which is oil in this case) from the bearings.

The stator assemblies of compressor 12 rotatably support the drive shaft 42 by a ball bearing means 76 and bearing support means 78 secured to the compressor case (not shown). A suitable passage or opening 80 is provided in this connection to permit the exhaust of lubricating fluid from the tie-bolt openings 74 to flow into the sump 81 from which it is withdrawn through a collection tube 82.

Referring now to the lubrication of the bearings, within the hollow drive shaft 18 is an oil conduit 84 adapted to deliver lubricating oil under pressure from an engine-driven pump (not shown), this conduit connecting with passages 86, 88 and 90 provided in supporting disks 92, 94 and 96, respectively, and passages 93, 95 and 97 provided in drive shaft 18 for the passage of oil from the conduit 84 to the bearings 32, 62 and 40 to lubricate the same. The support for bearing 32 is provided with suitable notches or openings 98, 99 to drain oil from the front of this bearing into the tie-bolt 58. Oil from the rear of bearing 32, both sides of bearing 62, and the front of bearing 40 flows directly into the tie-bolt. This oil flows between ribs 59 and out through openings 74. The drive shaft 42 is also provided with holes 104 for the passage of oil from the rear side of bearing 40 to the passage 80.

Referring now to the means for preventing the hot gases or air in the compressor sections from reaching the bearings, a labyrinth seal means 108 is provided between drive shaft 18 and stator assembly 30 for limiting the passage of air or gas to or from the section inward of the rotor blade platforms 110, 112 and stator blade shroud rings 114 and 116.

Also, suitably fastened to the end of the tie-bolt 58 adjacent the flange 60 are flange members 118 and 120 cooperating with flanges 122 and 124, respectively, attached to the low pressure compressor bearing support section 126 of stator assembly 30 to form labyrinth seal means 128 and 130.

The connection of the tie-bolt 58 to the rotor assemblies of compressor 12 is such that a space or opening 132 is provided communicating at one end through holes 69 and holes or apertures 133 and 134 with the labyrinth seals 108, 128 and 130, and at the other end with one or more holes or bores 136 provided in the hub of the next to last stage disk 138 of the rotor. Bore 136 communicates with a hole or passage 140 in the last stage rotor disk 141 to conduct the air or gas leaking from the labyrinth seals to the atmosphere through an opening 142 in the bearing support 78 and an overboard vent (not shown). Fluid sealing means 146 is provided between the support 36 and the flange 118.

Operation

Upon rotation of the drive shafts 18 and 42 by turbine means (not shown), lubricating oil under pressure will flow through the conduit means 84 and the supporting members 92, 94 and 96 to the respective bearings 32, 62 and 40 to lubricate the same. Because of the rotating portions of the drive shaft 18 and the cooperating rotor sections, a considerable amount of centrifugal force will be exerted upon the lubricating oil to cause the same to be forced through the bearings and outwardly through the notches 98, 100 and 102. Due to the conical-like shape of the flange 118 and tie-bolt 58, these parts act as a scavenging pump and cause the oil to be propelled through the opening 72 and along the tapered wall 70 of the tie-bolt 58, through the openings 74 and 80 to the sump which is drained through the tube 82, thus delivering the excess lubricating oil from the bearings to the sump for re-circulation.

At the same time, hot gases from the compressor sections leaking through the labyrinth seals 108, 128 and 130 will pass through the openings 133, 134, 69, 136, 140 and out to the atmosphere through the opening 142 in the last stage rotor support 144.

The dual spool compressors are thus assured of complete relief of excess lubricating fluid from the section and is assured of having the hot gases conducted away from the bearings.

It will therefore be seen from the foregoing that this invention provides a lubricating system with an annular conical member having its tapered wall portion designed to use the effect of centrifugal force on the rotating lubricant for assuring a rapid and effective re-circulation of the lubricating fluid, while at the same time eliminating the low pressure compressor labyrinth seal leakage air by conveying the seal leakage to the atmosphere through the space between the scavenging pump and the high pressure compressor rotors. It will further be seen that the member joining the high pressure compressor rotors has a number of functions; i.e., first, to act as a tie-bolt, secondly, to serve as an oil pump, and thirdly, to divide the space between the rotors and the drive shaft into air and oil passages. It will be understood that the invention can be modified beyond the illustrated embodiments, and therefore, any limitations to be imposed are those set forth in the following claims.

I claim:

1. A lubricant scavenging system for use with multi-spool engine compressors including, first and second compressors each having rotor and stator assemblies, bearing means between said first compressor rotor and stator assemblies permitting relative rotation therebetween, second bearing means between said first and second compressor rotor assemblies permitting relative rotation therebetween, conduit means containing lubricant under pressure, means connecting said conduit means and said bearing means for lubricating the same, and means for scavenging the lubricant from said bearings means, said latter means comprising an annular hollow longitudinally tapered member securing the rotor assemblies of one of said compressors together for joint rotation therewith, means connecting said bearing means and one end of said member for communicating the lubricant discharged from said bearing means into said member, and sump means operatively connected to the other end of said member, rotation of said member upon rotation of said compressor rotor assemblies subjecting said lubricant to the effect of centrifugal force propelling said lubricant discharged from said bearing means through said tapered member to said sump.

2. A lubricant scavenging system for use with multi-spool engine compressors including a plurality of compressors each having rotor and stator assemblies, bearing means between the stator and rotor assemblies of one of said compressors and the rotor assemblies of said one and the remaining of said compressors permitting relative rotation between said respective assemblies, conduit means containing a lubricant under pressure, means connecting said conduit means and said bearing means for lubrication thereof, gas seal means between said rotor and stator assemblies preventing the communication of gas therebetween, and means connecting the rotor assemblies of one of said compressors together, said means scavenging the lubricant from said bearing means, said latter-named means comprising a tapered means, a sump for said lubricant, means connecting one end of said tapered means to said sump, means connecting the other end of said tapered means and said bearing means, said tapered means connecting said rotor assemblies together in a manner defining a space between said means and said assemblies for the passage of gas therethrough, rotation of said tapered means creating a centrifugal force on said lubricant causing said lubricant to be moved from said bearings means to said sump along the taper of said tapered means.

3. A scavenging system as in claim 2, wherein said space comprises a drain passage for any leakage of gas through said seal means.

4. A multi-drive mechanism comprising, a plurality of drive shafts, a plurality of rotatable assemblies fixed to each of said drive shafts, a stationary assembly interposed between a rotatable assembly on a first one of said drive shafts and the rotatable assembly on another of said drive shafts, bearing means between said stationary assembly and one of said drive shafts for rotation of said one drive shaft relative thereto, other bearing means between said drive shafts for relative rotation thereof with respect to each other, and means for lubricating said bearing means, said means including a conduit containing a lubricant under pressure, means connecting said conduit and said bearing means, and means for removing lubricant from said bearing means, said means comprising an annular hollow member fixed to one of said drive shafts for rotation therewith, said member having a longitudinally tapered wall, said annular member defining a lubricant chamber, means conducting lubricant from said bearing means to one end of said chamber, a sump connected to the other end of said chamber, rotation of said member creating a centrifugal force on said lubricant for cooperation with said tapered wall to cause said lubricant to be moved from said bearing means to said sump.

5. A fluid scavenging system for use with a plurality of bearing means including a rotatable shaft, a second rotatable shaft, bearing means between said shafts permitting relative rotation therebetween, and means for supplying lubricating fluid to said bearing means, said last-named means including a conduit containing a lubricating fluid under pressure, and further means for discharging the fluid from said bearing means, said further means including a tapered member surrounding said one shaft and fixed to said second shaft, said member defining a fluid chamber therein, and passage means connecting the fluid at said bearing means to said chamber, rotation of said second shaft effecting a centrifugal force on said fluid at said bearing means moving said fluid along the tapered wall of said chamber.

6. A fluid scavenging system for use with multi-spool engine compressors including first and second compressors each having at least one rotor and stator assembly, a drive shaft for each of said compressors, bearing means between one stator assembly and the drive shaft of the first compressor, other bearing means between at least one rotor assembly of the second compressor and the drive shaft of the first compressor, gas sealing means between the stator and rotor assemblies of the first compressor and the latter stator assembly and a rotor assembly of the second compressor to prevent the leakage of gas into communication with said bearing means, and means for lubricating said bearing means, said means including a conduit communicating with said bearing means and containing a lubricating fluid under pressure, a sump for collecting any excess fluid from said bearing means, and means for scavenging the said excess fluid, said scavenging means comprising an annular tapered member fixed to the rotor assembly of one of said compressors for rotation therewith, said member communicating at opposite ends with said bearing means and said sump respectively, the fixing of said member to said rotor assembly providing a space for the passage of gas therethrough, said space communicating at one end with the atmosphere and at its other end with said sealing means, the confines of said member defining a tapered fluid chamber therein, rotation of said rotor assembly and member creating a centrifugal force on said lubricating fluid to cause said fluid to be propelled from said bearing means to said sump along the taper of said chamber, said rotation further causing any gas leaking through said seal means to pass through said space away from said bearing means.

7. A fluid scavenging system including first and second rotatable means, bearing means between said rotatable means, and a fluid lubricating system communicating with said bearing means, said system including means for relieving the said bearing means of any excess lubricating fluid, said means comprising a pump attached to one of said rotatable means, said pump comprising an annular rotatable tapered member, a sump for the excess fluid, said pump communicating at one end with said bearing means and at the other end with said sump, rotation of said pump creating a centrifugal force on said excess lubricating fluid forcing said fluid along the taper of said pump away from said bearing means to said sump.

8. A fluid scavenging system comprising, a plurality of relatively rotatable means, bearing means between said rotatable means permitting said relative rotation, a conduit filled with lubricating fluid communicating with said bearing means, a sump operatively communicated with said bearing means for the discharge of fluid thereinto from said bearing means, and pump means between said bearing means and said sump, said pump means comprising an annular hollow member connected for rotation with one of said rotatable means, said member having an axially tapered wall, rotation of said member creating a centrifugal force on said lubricating fluid causing said fluid to be discharged from said bearing means to said sump along said tapered wall.

9. A scavenging system as in claim 8, wherein said system is provided with gas sealing means between said rotatable means, the connection of said member to said one rotatable means providing a space therebetween for the passage of seal gas leakage therethrough.

10. In a gas turbine, first and second compressors each including a rotor assembly, bearing means between the rotor assemblies, air seal means between the compressors and the bearing means, one of said rotor assemblies including means defining an air conduit for the passage of air therethrough leaking through the air seal means, a tapered member rotatable with the said one rotor assembly and mounted within the air conduit coaxially with the rotor assemblies, means supplying lubricating oil to the bearing means for lubricating the same, the member extending from a point adjacent the bearing means to a discharge point for scavenged oil and tapering outward in the direction away from the bearing means so that oil is propelled from the bearing means to the discharge point by centrifugal force upon rotation of said member.

11. A fluid scavenging system for use with multi-spool engine compressors including first and second compressors each having a plurality of rotatable stages, bearing means between the stages of one compressor and the stages of another compressor, fluid sealing means also between the stages of one compressor and the stages of another compressor, and a fluid lubricating system communicating with said bearing means, said system including means relieving the said bearing means of excess lubricating fluid delivered thereto, said means comprising a pump attached to the stages of one compressor, said pump comprising a hollow annular frusto-conically shaped member communicating with said sealing means, any leakage of fluid through said sealing means passing into said hollow member away from said bearing means, rotation of said pump creating a centrifugal force on said excess fluid causing said excess fluid to be moved along the conical surface of said pump away from said bearing means.

References Cited in the file of this patent

UNITED STATES PATENTS

| | | |
|---|---|---|
| 2,709,567 | Wood | May 31, 1955 |
| 2,749,087 | Blackman et al. | June 5, 1956 |
| 2,812,898 | Buell | Nov. 12, 1957 |
| 2,878,894 | Andrews | Mar. 24, 1959 |